US006325942B1

(12) United States Patent
Freije, III (10) Patent No.: US 6,325,942 B1
(45) Date of Patent: Dec. 4, 2001

(54) LIQUID TREATMENT UNIT (76) Inventor: William F. Freije, III, 8340 Hidden Pointe Dr., Indianapolis, IN (US) 46256

( * ) Notice: Subject to any disclaimer, the term of this patent is extended or adjusted under 35 U.S.C. 154(b) by 0 days.

(21) Appl. No.: 09/600,689

(22) PCT Filed: Jan. 22, 1999

(86) PCT No.: PCT/US99/01431

§ 371 Date: Jul. 21, 2000

§ 102(e) Date: Jul. 21, 2000

(87) PCT Pub. No.: WO99/37380

PCT Pub. Date: Jul. 29, 1999

Related U.S. Application Data (60) Provisional application No. 60/072,217, filed on Jan. 22, 1998.

(51) Int. Cl.$^7$ ................................................. B01D 35/06
(52) U.S. Cl. ........................... 210/695; 210/222; 210/232
(58) Field of Search ................................... 210/222, 232, 210/695

(56) References Cited

U.S. PATENT DOCUMENTS

| | | |
|---|---|---|
| D. 253,841 | 1/1980 | Sanderson . |
| 3,951,807 | 4/1976 | Sanderson . |
| 4,050,426 | 9/1977 | Sanderson . |
| 4,153,559 | 5/1979 | Sanderson . |
| 4,216,092 | 8/1980 | Shalhoob et al. . |
| 4,299,700 | 11/1981 | Sanderson . |
| 4,320,003 | 3/1982 | Sanderson et al. . |
| 4,357,237 | 11/1982 | Sanderson . |
| 4,430,785 | 2/1984 | Sanderson . |
| 4,455,229 | 6/1984 | Sanderson et al. . |
| 5,043,063 | 8/1991 | Latimer . |

OTHER PUBLICATIONS

"Experimental Evidence For Effects of Magnetic Fields on Moving Water," Dr. Klaus J. Kronenberg, IEEE Transactions on Magnetics, vol. MAG. 21, No. 5 Sep. 1985.

"$H_2O$? The Glory and the Riddle," Dr. Klaus J. Kronenberg, Undated.

Primary Examiner—David A. Reifsnyder
(74) Attorney, Agent, or Firm—Bose McKinney & Evans LLP (57) ABSTRACT

A liquid treatment unit (10) is provided for physically altering the molecular structure of a body of liquid. The liquid treatment unit (10) includes pipe couplers (16, 18) and first and second treatment cores (22, 24) extending between the pipe couplers (16, 18). Each of the treatment cores (22, 24) includes a pipe (38), a rod (62) extending through the pipe (38), and a plurality of magnets (42) coupled to the pipe (38). The magnets (42) include spaced-apart north and south poles (76, 78) and the magnets (42) and the rod (62) cooperate to create magnetic lines of flux flowing through the pipes (38). The magnets (42) of the first and second treatment cores (22, 24) are positioned to align the north poles (76) of the first treatment core (22) magnets (42) with the north poles (76) of the second treatment core (24) magnets (42) along a longitudinal axis (34) and align the south poles (78) of the first treatment core (22) magnets (42) with the south poles (78) of the second treatment core (24) magnets (42) along the longitudinal axis (34).

28 Claims, 5 Drawing Sheets

LIQUID TREATMENT UNIT

This application is a 371 of PCT/US99/01431, filed Jan. 22, 1999, which claims the benefit of U.S. Provisional Application No. 60/072,217, filed on Jan. 22, 1998.

The present invention relates to devices used to physically alter the molecular structure of a body of liquid. More particularly, the present invention relates to devices using magnets which create magnetic lines of flux through which a liquid flows to physically alter the molecular structure of a body of liquid.

Liquid water is made up of approximately 50% single $H_2O$ molecules and 50% super molecules or complexes of 50 to 200 $H_2O$ molecules. The super molecules encircle and encapsulate foreign particles in the liquid. Foreign particles that are encapsulated are not available to serve as nucleation sites. Nucleation sites are necessary as starting points for all phase changes such as boiling and freezing and the crystallization of minerals.

When calcium carbonate becomes over concentrated in water, either by heating or evaporating of the water, the calcium carbonate solidifies. The calcium carbonate requires nucleation sites to start solidifying. If sufficient nucleation sites do not exist in foreign particles in the water, the calcium carbonate solidifies on surfaces exposed to the water such as a coil or the inside walls of pipe. The calcium carbonate forms calcium carbonate crystals which firmly attached to these surfaces. The calcium carbonate crystals then serve as nucleation sites for more crystallization so that layers of calcium carbonate crystals are formed. The layers of calcium carbonate crystals are commonly referred to as calcium carbonate or hard lime scale.

When water flows past a series of magnets at a certain speed, the water is effected by magnetic lines of flux produced by the magnets. The water passes through a certain number of lines of flux each second and thus a frequency is produced. If this frequency matches the resonance frequency of the water, the frequency created by the magnets "fractures" the water so that the super molecules no longer encapsulate foreign particles in the water thus making the internal foreign particles of water available as nucleation sites on which the over concentrated calcium carbonate can solidify. This fracturing of the water is similar to vibrations of a earthquake causing a "resonance catastrophe" to buildings and other structures.

Because of the resonance, a significant number of these water super molecules are opened to expose the foreign particle and thus provides the over concentrated calcium carbonate nucleation sites within the water. The calcium carbonate molecules that are encapsulated within the water will typically join and grow evenly on all sides around the foreign particle to form what visually would look like circular discs. These circular disc-shaped calcium carbonate molecules do not crystallize on pipes and typically flow down a the drain or settle in a very low velocity area such as a sump basin to form a soft, very fine mud. This soft mud or soft calcium carbonate is sometimes called aragonite because of its crystalline shape versus calcite which is hard lime scale. See the following articles, the disclosures of which are incorporated herein, for additional information about the effects of magnetic fields on moving water; $H_2O?$ *The Glory and the Riddle*, Dr. Klaus J. Kronenberg and *Experimental Evidence For Effects Of Magnetic Fields On Moving Water*, Dr. Klaus J. Kronenberg, IEEE Transactions On Magnets, Vol. Mag. 21, No. 5, September 1985, pgs. 2059–2061.

It is known to provide treatment cores having magnets to produce a frequency that affects the water's ability to form lime scale. See, for example, U.S. Pat. No. 4,357,237; 4,455,229; 4,050,426; D253,841; 4,430,785; 3,951,807; 4,153,559; 4,299,700; 4,320,003, the disclosures of which are incorporated by reference herein. Ring magnets with concentrator rings on both poles (top and bottom) and non-magnetic spacers between each magnet produce a frequency as water passes by each magnet. The lines of flux from each magnet are drawn to the inside of the water pipe via a steel rod in the center of the pipe and back to the opposite pole so the water passing around the steel rod meets each magnetic line of flux at a right angle.

According to the present invention, a liquid treatment unit is provided. The water treatment unit includes first and second pipe couplers spaced apart from each other along a longitudinal axis and first and second treatment cores. The first and second treatment cores extend between the first and second pipe couplers. Each of the first and second treatment cores includes a pipe, a rod, and a plurality of magnets. The pipes of the first and second treatment cores include an outer surface and an inner surface that defines an interior region through which liquid is permitted to flow. The rods of the first and second treatment cores extend through the interior region of the pipe. The plurality of magnets of the first and second treatment cores are coupled to the pipe. The magnets include spaced-apart north and south poles and the magnets and the rods cooperate to create magnetic lines of flux flowing through the interior regions of the pipes. The magnets of the first and second treatment cores are positioned to align the north poles of the first treatment core magnets with the north poles of the second treatment core magnets along the longitudinal axis and align the south poles of the first treatment magnets with the south poles of the second treatment core magnets along the longitudinal axis.

In preferred embodiments, the treatment core further includes a bypass core extending between the first and second pipe couplers. The bypass core and the first and second treatment cores are sealed to the first and second pipe couplers.

A method for treating a liquid is also provided. The method provides first and second pipes, a plurality of magnets coupled to the first and second pipes, and first and second rods. The first and second rods extend through the first and second pipes, respectively. The magnets include north and south poles. The magnets are coupled to the first and second pipes so that the north poles of the magnets coupled to the first pipe are aligned with the north poles of the magnets coupled to the second pipe and the south poles of the magnets coupled to the first pipe are aligned with the south poles of the magnets coupled to the second pipe. The magnets and rods extending through the first and second pipes cooperate to create magnetic lines of flux in the first and second pipes. Liquid is passed through the magnetic lines of flux in the first and second pipes to treat the liquid.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figures 1, 2:
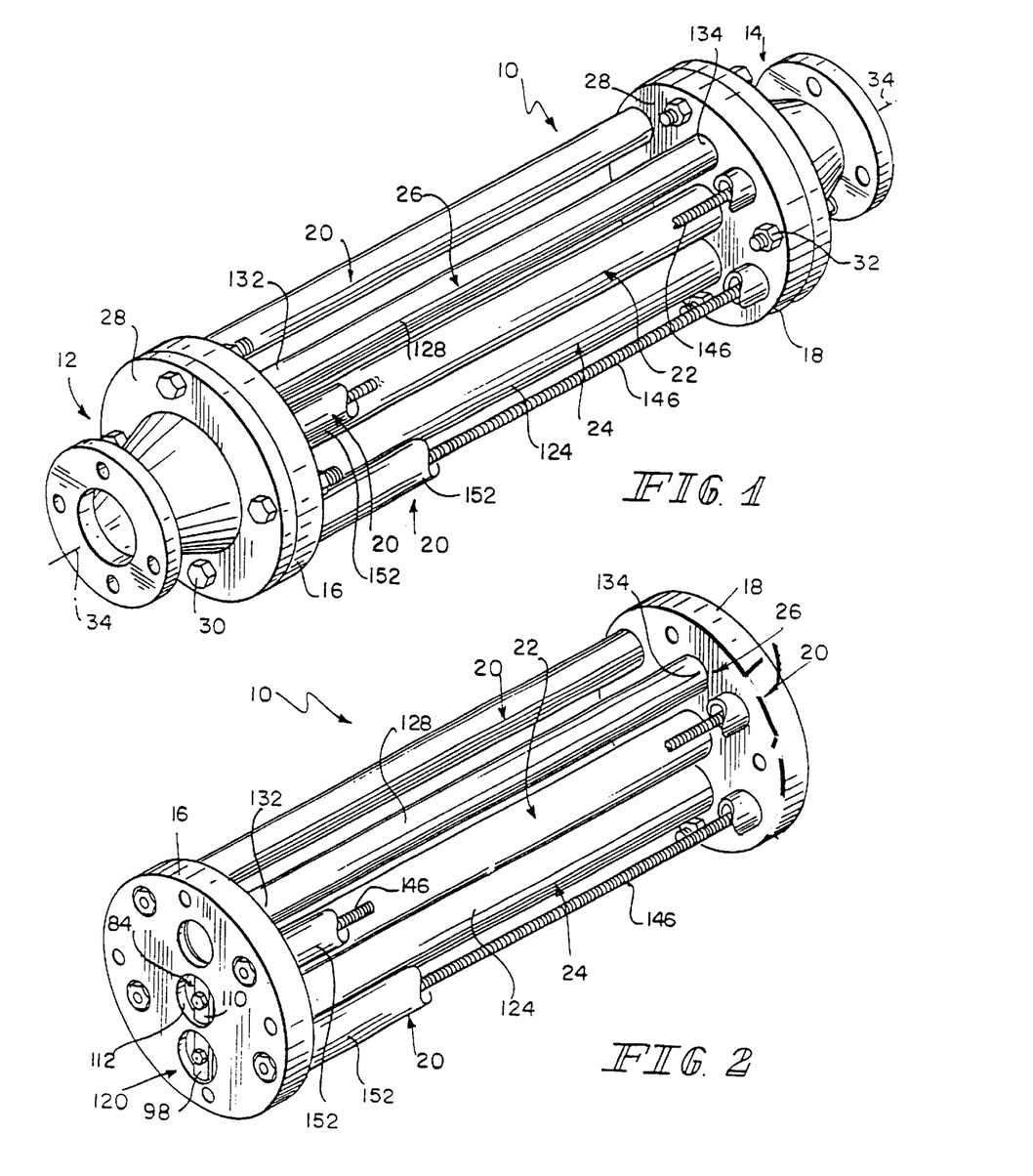
FIG. 1 is a perspective view of the water treatment unit, with portions cutaway, and reducers coupled to opposite ends of the water treatment unit.
FIG. 2 is a perspective view of the water treatment unit, with portions cutaway, showing the-water treatment unit including spaced-apart first and second flanges and two treatment cores, a bypass core, and connecting rods extending between the first and second flanges.

A water or liquid treatment unit 10 is shown in FIGS. 1 and 2. The water treatment unit 10 is coupled to conventional process pipe (not shown) through reducers 12, 14 as shown in FIG. 1 so that water or another fluid may flow into and out of treatment unit 10. In alternative embodiments, treatment unit 10 may be connected to any type of piping component.

The treatment unit 10 includes spaced-apart non-magnetic pipe couplers or flanges 16, 18 and a plurality of flange-connecting rod units 20, first and second treatment cores 22, 24, and a bypass core 26 extending between flanges 16, 18 as shown in FIGS. 1 and 2. The reducers 12, 14 include flanges 28 and flanges 16, 18 of treatment unit 10 are connected to flanges 28 of reducers 12, 14 by a plurality of bolts 30 and nuts 32. The treatment unit 10 further includes a longitudinal axis 34 and the treatment cores 22, 24 and bypass core 26 are positioned to extend between flanges 16, 18 parallel to longitudinal axis 34 as shown, for example, in FIG. 1.

As water flows through treatment unit 10, the water passes through treatment cores 22, 24 and bypass core 26. The water that passes through treatment cores 22, 24 is treated to physically alter the molecular structure of a body of liquid. For example, the treatment cores encapsulate calcium carbonate within water as discussed above to decrease the amount of hard lime scale that forms within the piping system. In addition, the treatment cores 22, 24 alter the surface tension and other properties of the water to give the water desirable characteristics. The water that passes through bypass core 26 is not treated.

In the illustrated embodiment of the present invention, treatment unit 10 includes one bypass core 26 and two treatment cores 22, 24. In alternative embodiments of the present invention, the treatment unit may include any number and size of treatment cores and bypass cores. The number and size of treatment cores 22, 24 compared to the number and size of bypass core(s) 26 determines the percentage of water treated in the treatment cores 22, 24 and the percentage of water that passes untreated through the bypass core(s) 26. For example, a treatment unit may not include a bypass core so that all of the water flowing through the treatment unit is treated.

Figure 3:
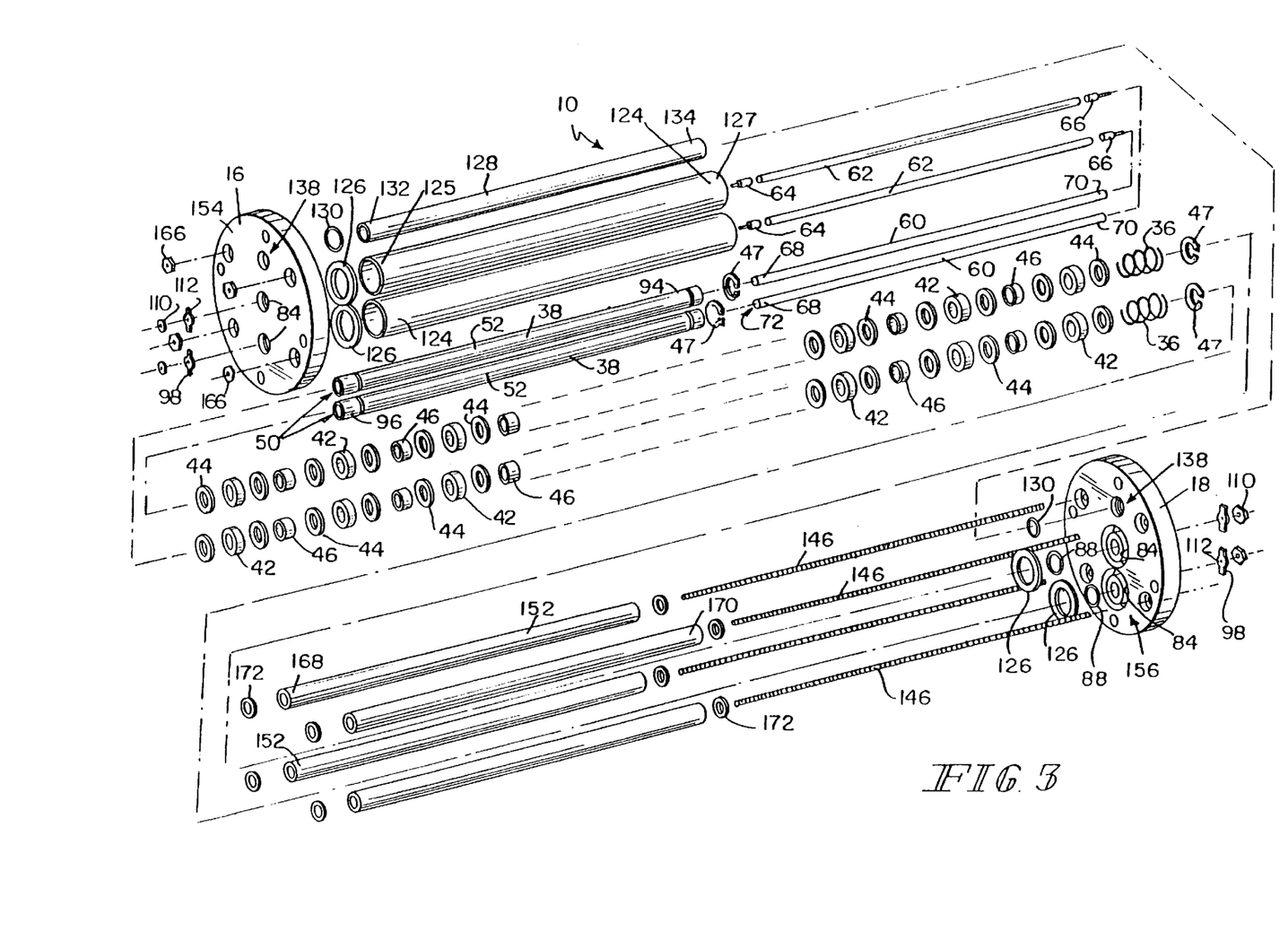
FIG. 3 is an exploded perspective view of the water treatment unit.
Figure 4:
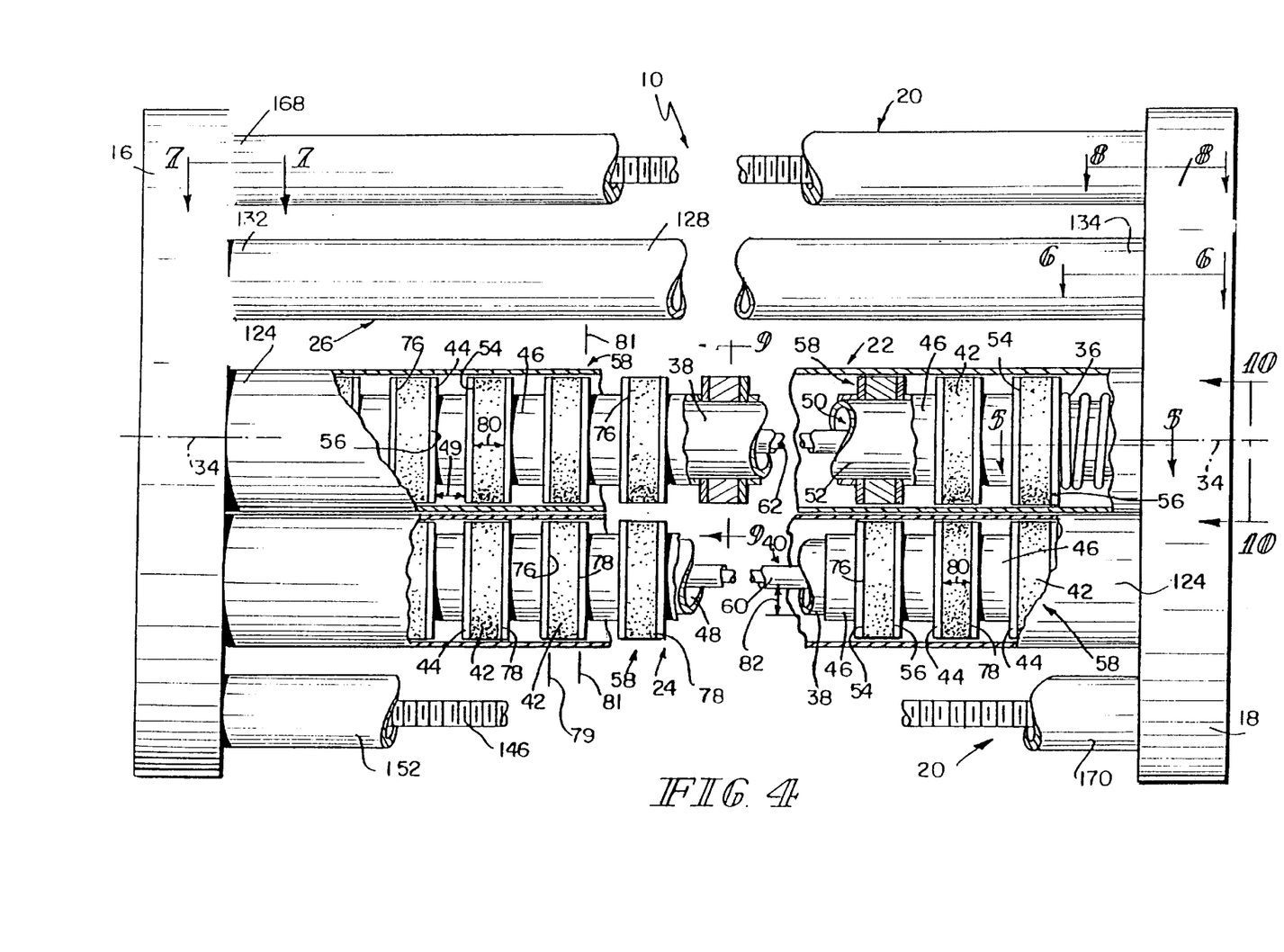
FIG. 4 is a side elevational view of the water treatment unit, with portions cutaway, showing that the treatment cores each include a pipe, a plurality of spaced-apart magnets around the pipe, and a rod extending through the pipe.

Each of the treatment cores 22, 24 includes a spring 36, a pipe 38, a rod assembly 40, a plurality of ring magnets 42, a plurality of collector plates 44, a plurality of spacers 46, and first and second retainer rings 47 as shown, for example, in FIGS. 3 and 4. Pipe 38 is non-magnetic and includes an inner surface 48 that defines an interior region 50 of pipe 38 and an outer surface 52. Rod assembly 40 is positioned to lie in the center of and extend through interior region 50 of pipe 38 between flanges 16, 18.

Figure 5:
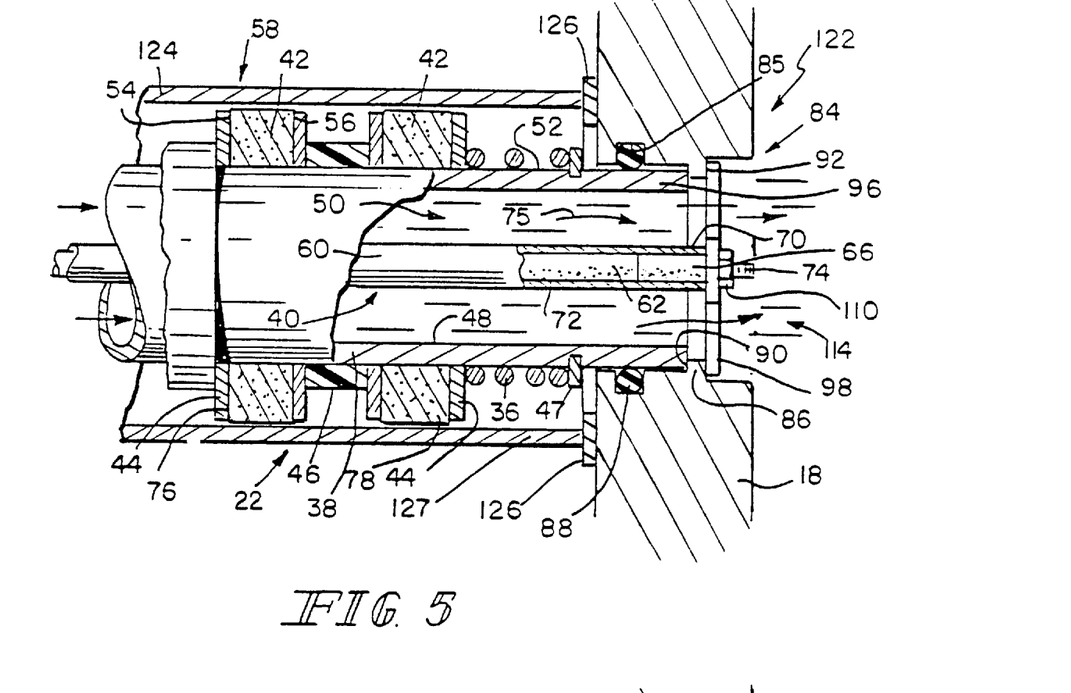
FIG. 5 is a sectional view, with portions cutaway, taken along line 5—5 of FIG. 4, showing the second flange having an aperture to receive the treatment core and a sealed connection between the flange and treatment core.

Magnets 42, collector plates 44, and spacers 46 are stacked over outer surface 52 of pipe 38 as shown, for example, in FIGS. 4 and 5. Each of magnets 42 include spaced-apart first and second ends 54, 56 and a collector plate 44 is positioned to abut each of first and second ends 54, 56 of magnets 42 so that a magnet 42 and its accompanying two collector plates 44 define a magnet assembly 58. In alternative embodiments of the present invention, the magnet assemblies only include magnets and not collector plates.

Spacers 46 are positioned to lie between magnet assemblies 58 as shown, for example, in FIGS. 4 and 5. In preferred embodiments, the spacers are made of a PVC material. In alternative embodiments of the present invention, the spacers may be made of any type of nonmagnetic material.

Rod assembly 40 includes a hollow tube 60, a solid rod 62, and spaced-apart first and second inserts 64, 66 as shown, for example, in FIGS. 3–5. Hollow tube 60 includes first and second ends 68, 70 and a rod-receiving aperture 72 extending between first and second ends 68, 70. Rod 62 is positioned to lie in rod-receiving aperture 72 and first and second inserts 64, 66 are positioned to lie in rod-receiving aperture 72 at first and second ends 68, 70, respectively, to trap rod 62 within tube 60. Each insert 64, 66 of rod assembly 40 includes a threaded post 74 extending outwardly away from pipe 38.

Magnet assemblies 58 and rod assemblies 40 cooperate to create magnetic lines of flux through which water passes as it travels in direction 75 through interior region 50 of pipes 38 of treatment cores 22, 24. As the water passes through the lines of flux at a desired speed, a frequency is created that fractures water molecules and otherwise physically alters the molecular structure of the water. For example, nucleation sites are created in the water molecules and calcium carbonate becomes encapsulated in the water molecules. By encapsulating the calcium carbonate within the water, the amount of hard lime scale that forms in the piping system is reduced.

Spacers 46 include a length 49 that dictates the frequency produced by the magnetic lines of flux. The length 49 of spacers 46 is adjusted to compensate for the composition and velocity of the liquid passing through treatment unit 10.

Magnets 42 include spaced-apart north and south poles 76, 78 at first and second ends of magnets 54, 56, respectively, as shown in FIGS. 4 and 5. A collector plate 44 is positioned to abut each of north and south poles 76, 78 to concentrate the magnetic energy of magnets 42 within collector plates 44. The magnetic lines of flux pass from the collector plate 44 abutting south pole 78 of magnet 42 to rod 62 of rod assembly 40 to the collector plate 44 abutting north pole 76 of magnet 42.

Rod 62 is made of a steel material (soft iron) to attract the lines of flux. The steel material is subject to corrosion and thus rod 62 is positioned to lie within hollow tube 60 which is made of corrosion resistant stainless steel. Inserts 64, 66 are also made of a stainless steel material to isolate rod 62 from the corrosive atmosphere in interior region 50 of pipe 38. The stainless steel hollow tube 60 permits the lines of flux to pass through to rod 62 without affecting the magnetic lines of flux.

Each magnet 42 includes a thickness 80 between first and second ends 54, 56 that is greater than a distance 82 between magnet 42 and rod 62, as shown in FIG. 4, so that the lines of flux travel between north and south poles 76, 78 through rod 62 and not travel directly from south pole 78 to north pole 76. In preferred embodiments of the present invention, magnet 42 has a thickness 80 of about 0.5 in. (1.27 cm.) and the distance 82 between magnet 42 and rod 62 is about 0.4 in. (1.0 cm). In alternative embodiments of the present invention, other magnet thicknesses and distances between the rod and magnet may be selected as long as the magnet thickness is greater than the distance between the magnet and rod.

The retaining rings 47 are primarily used to hold magnet assemblies 58 and spacers 46 on pipe 38 when assembling treatment unit 10. During assembly of treatment unit 10 before both flanges 16, 18 engage treatment cores 22, 24, the poles 76, 78 of magnets 42 and connector plates 44 of treatment cores 22, 24 may not be aligned and thus magnets 42 are prone to "popping" off of pipes 38. Retaining rings 47 hold magnet assemblies 58 and spacers 46 on pipe 38 during this stage of assembly to prevent magnets 42 from popping off of pipes 38.

In each treatment core 22, 24, one retaining ring 47 is positioned between flange 18 and the magnet assembly 58 positioned closest to flange 18, as shown in FIG. 5, and the other retaining ring 47 is similarly positioned between flange 16 and the magnet assembly 58 closest to flange 16. In the illustrated embodiment, the retaining rings 47 are conventional Rotor Clip® retaining rings. Retaining rings 47 also provide a secondary function of holding magnet assemblies 58 and spacers 46 in alignment as shown, for example, in FIG. 5.

The treatment cores 22, 24 are positioned to lie adjacent to each other without any type of magnetic shielding between treatment cores 22, 24. The magnets 42 and collector plates 44 of treatment cores 22, 24 are positioned to lie in treatment unit 10 so that south poles 78 of magnets 42 and collector plates 44 of treatment core 22 are aligned with south poles 78 of magnets 42 and collector plates 44 of treatment core 24 along longitudinal axis 34 and north poles 76 of magnets 42 and collector plates 44 of treatment core 22 are aligned with north poles 76 of magnets 42 and collector plates 44 of treatment core 24 along longitudinal axis 34. The north and south poles 76, 78 of these magnets 42 are aligned along longitudinal axis 34 because each magnet 42 on first treatment core 22 has a corresponding magnet 42 on second treatment core 24 and for each of these corresponding magnets 42 the north poles 76 of the magnets 42 lie in a plane 79 that is perpendicular to longitudinal axis 34 and the south poles 78 of the magnets 42 lie in a plane 81 that is perpendicular to longitudinal axis 34 as shown in FIG. 4. In alternative embodiments of the present invention, the magnets and collector plates of one treatment core may abut the magnets and collector plates of another treatment core because the north and south poles of the magnets and collector plates are aligned along the longitudinal axis.

If like poles 76, 78 of the ring magnets 42 and concentrator rings 44 of treatment cores 22, 24 are aligned, the magnets 42 can be brought as close together as needed to the point of touching without causing interference in the frequency or "magnetically induced resonance." Because the poles 76, 78 that are almost touching are identical to poles 76, 78, the closer the magnets 42 and the concentrator rings 44 of the neighboring treated cores 22, 24 are to one another, the stronger the frequency. Providing multiple treatment cores 22, 24 having aligned north and south poles 76, 78 strengthens the desired frequency of each core 22, 24.

The north and south poles 76, 78 of treatment cores 22, 24 are aligned along longitudinal axis 34 by (1) providing relatively small dimensional tolerances for magnets 42, collector plates 44, and spacers 46, (2) the compression springs 36 hold the magnets 42, collector plates 44, and spacers 46 together tightly regardless of the orientation of the treatment unit 10, and (3) flanges 16, 18 are machined to form treatment core-mounting, apertures 84 as shown, for example, in FIGS. 3–5. The treatment core-mounting apertures 84 formed in flanges 16, 18 permit treatment cores 22, 24 to be positioned relative to flanges 16, 18 in a precise manner.

The compression spring 36 of each treatment core 22, 24 presses the magnets 42, collector plates 44, and spacers 46 together. The spring 36 is nonmagnetic and is positioned to lie adjacent to flange 18 between a retaining ring 47 and collector plate 44. The spring 36 biases magnet assemblies 58 and spacers 46 toward flange 16 to hold magnet assemblies 58 and spacers 46 together tightly when treatment unit 10 is in any orientation. By keeping magnet assemblies 58 and spacers 46 pressed together tightly regardless of the orientation of treatment unit 10, magnet assemblies 58 of treatment cores 22, 24 maintain proper alignment along longitudinal axis 34. Springs 36 also act as shock absorbers for magnet assemblies 58 and spacers 46. The term spring 36 encompasses any type of device which biases or presses magnet assemblies 58 and spacers 46 together. For example, the term spring 36 encompasses a flexible piece of rubber which biases or presses magnet assemblies 58 and spacers 46 together.

The treatment core-receiving apertures 84 include an O-ring or seal-receiving groove 85 and a pipe-retaining lip 86. While only flange 18 is illustrated in FIG. 5, it will be understood that flange 16 is formed to include an identical treatment core-mounting aperture 84. Each treatment core 22, 24 further includes two seals or O-rings 88 and each O-ring 88 is positioned to lie in an O-ring-receiving groove 85 to seal the treatment cores 22, 24 to flanges 16, 18. The pipe-retaining lip 86 includes a first surface 90 facing toward pipe 38 and a second surface 92 facing away from pipe 38. Each pipe 38 includes spaced-apart first and second ends 94, 96 that are positioned to lie in treatment core-receiving apertures 84 of flanges 16, 18, respectively, as shown in FIGS. 3 and 5. Pipe-retaining lip 86 acts as a stop to prevent pipe 38 from sliding through apertures 84 and out of flanges 16, 18.

Each treatment core 22, 24 further includes two alignment plates 98 and lock nuts 110 that secure rod assemblies 40 to flanges 16, 18 as shown in FIGS. 2, 3, 5, and 10. Each alignment plate 98 is formed to include an aperture 112 and is positioned to abut second surface 92 of lip 86 so that threaded post 74 of insert 64, 66 extends through aperture 112 as shown, for example, in FIGS. 3, 5, and 10. Locknut 110 is then threaded onto threaded post 74 to secure alignment plate 98 to flange 16, 18.

Figures 9, 10:
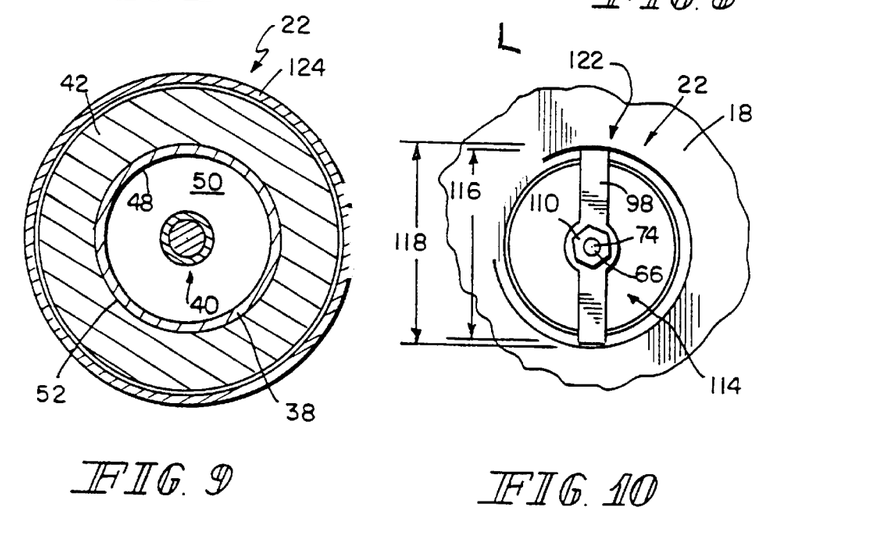
FIG. 9 is a sectional view, taken along line 9—9 of FIG. 4, showing the rod of the treatment core extending through the pipe of the treatment core.
FIG. 10 is an end elevational view, taken along line 10—10 of FIG. 4, showing the coupling of the rod of the treatment core to the second flange.

Alignment plate 98 is positioned in a portion of treatment core-receiving aperture 84 referred to as a recess 114. The alignment plate 98 includes a length 116 that is slightly less than a diameter 118 of recess 114 as shown in FIGS. 5 and 10. Length 116 of alignment plate 98 is just slightly less than diameter 118 of recess 114 so that alignment plate 98 may center rod 62 within pipe 38 even if locknut(s) 110 become loose.

In addition to securing rod assemblies 40 to flanges 16, 18, alignment plates 98 create a restriction in the flow path of the water and thus a pressure drop as the water enters and exits pipe 38. The locations of the alignments plates 98 will be referred to as the inlet 120 and outlet 122 of the treatment unit 10. FIG. 10 shows a cross sectional view taken perpendicular to longitudinal axis 34 through treatment unit outlet 122 and is identical to the cross sectional view of treatment unit inlet 120. FIG. 10 shows the cross sectional area available for the water to flow through treatment unit inlet and outlets 120, 122. If treatment cores 22, 24 did not include an alignment plate or if the alignment plate was smaller so as to not block as much of the cross sectional area of treatment unit inlet and outlet 120, 122, a smaller flow restriction and pressure drop would exist as compared to treatment cores 22, 24 including alignment plates 98.

FIG. 9 is a cross sectional view taken perpendicular to longitudinal axis 34 showing the cross sectional area available for water to flow through interior region 50 of pipe 38. The cross sectional view of FIG. 9 is typical of the cross section perpendicular to longitudinal axis 34 at any location along pipes 38 of treatment cores 22, 24. The alignment plates 98 are sized so that the cross sectional area (taken perpendicular to longitudinal axis 34) available for water flow at treatment unit inlet and outlet 120, 122 is smaller than the cross sectional area available for water flow within pipe 38.

Sizing alignment plates 98 in this manner "fills" pipe 38 with more water so that all of the water in pipe 38 flows at the proper velocity. Having the water move through pipe 38 at about the same velocity helps create the desired resonant frequency which fractures the water molecules. In addition, filling pipe 38 with more water exposes all of the water in pipe 38 to magnets 42. In alternative embodiments of the present invention, the alignment plate at the treatment unit outlet is sized to create a smaller cross sectional area available for water flow at the treatment unit outlet compared to other locations within the treatment core pipe and the alignment plate at the treatment unit inlet is sized to create the same or a larger cross-sectional area available for water flow at the treatment unit inlet compared to other locations within the treatment core pipe.

Each treatment core 22, 24 further includes a cover 124 as shown, for example, in FIGS. 3–5. Cover 124 includes spaced apart first and second ends 125, 127 positioned adjacent to flanges 16, 18, respectively. A gasket 126 is positioned between each flange 16, 18 and cover 124 to reduce or prevent vibration of cover 118. The cover 118 is made from a non-magnetic material. In alternative embodiments, each of the flanges is formed to include a cover-receiving groove on the inner surface of the flanges, the ends of the cover 118 are positioned in the cover-receiving grooves of the flanges, and a gasket 126 is positioned to lie in each of cover-receiving grooves 120. In other alternative embodiments of the present invention, the cover is not required.

Figure 6:
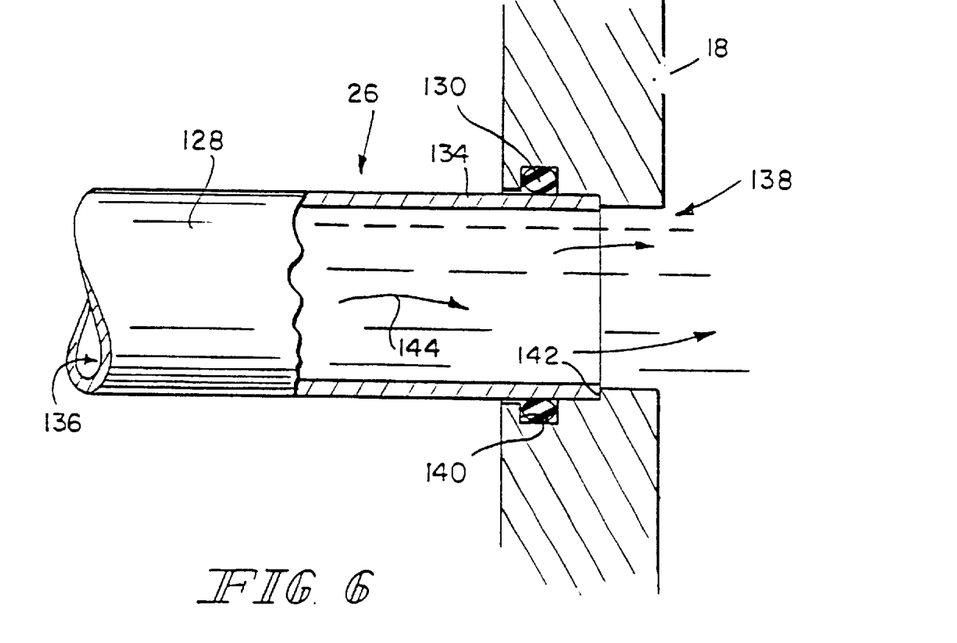
FIG. 6 is a sectional view, with portions cutaway, taken along line 6—6 of FIG. 4, showing the second flange having an aperture to receive the bypass core and the sealed connection between the bypass core and the flange.

The bypass core 26 includes a pipe 128 and two seals or O-rings 130 as shown in FIGS. 3, 4, and 6. Pipe 128 includes spaced-apart first and second ends 132, 134 and an interior region 136 through which water flows extending between first and second ends 132, 134. The bypass core 26 does not include magnets and thus the water passing through interior region 136 of pipe 128 in direction 144 is not subjected to any magnetic lines of flux.

Flanges 16, 18 are formed to include identical bypass core-receiving apertures 138 as shown, for example, in FIGS. 3 and 6. Each bypass core-receiving aperture 138 includes an O-ring or seal-receiving groove 140 and a pipe-retaining lip 142. First and second ends 132, 134 of pipe 128 are positioned in bypass core-receiving aperture 138 of flanges 16, 18, respectively. Pipe-retaining lip 142 acts as a stop to prevent pipe 128 from sliding through aperture 138 and out of flanges 16, 18. Each O-ring 130 is positioned to lie in an O-ring-receiving groove 140 to seal pipe 128 and thus bypass core 26 to flanges 16, 18.

Figure 7:
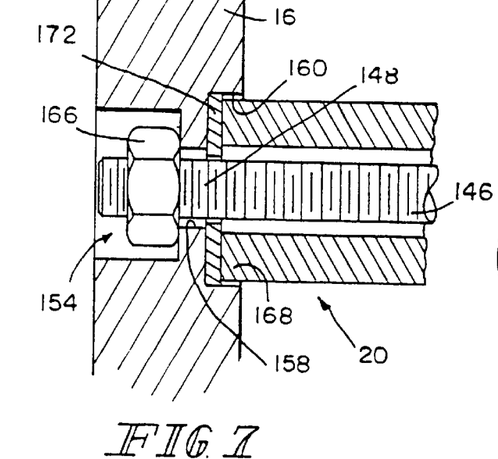
FIG. 7 is a sectional view, taken along line 7—7 of FIG. 4, showing the first flange having an aperture to receive the connecting rod.
Figure 8:
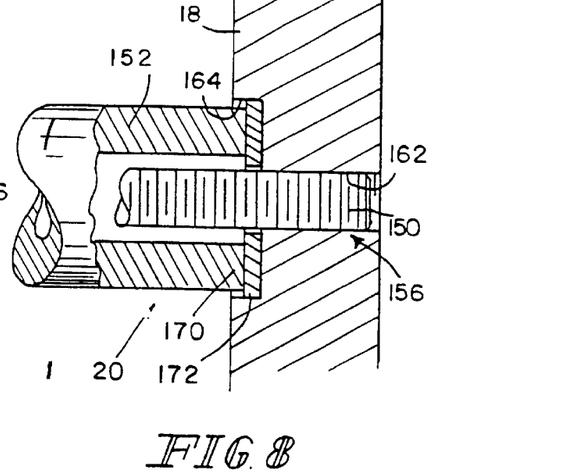
FIG. 8 is a sectional view, taken along line 8—8 of FIG. 4, showing the second flange having an aperture to receive the connecting rod.

Flange-connecting rod units 20 each include a rod 146 having spaced-apart first and second threaded ends 148, 150 and an outer cover 152 through which rod 146 extends as shown, for example, in FIGS. 1–4, 7, and 8. Flanges 16, 18 include different rod unit-receiving apertures 154, 156, respectively, as shown in FIGS. 7 and 8. Aperture 154 formed in flange 16 includes an opening 158 and a circular outer cover-receiving recess 160 as shown best in FIG. 7. Aperture 156 formed in flange 18 includes a threaded opening 162 to threadingly receive second threaded end 150 of rod 146 and a circular outer cover-receiving recess 164 as shown best in FIG. 8. First threaded end 148 of rod 146 extends through opening 158 and a locknut 166 is threaded onto first threaded end 148 to secure rod 146 to flange 16 and, more importantly, couple flanges 16, 18 together through rod 146. In the illustrated embodiment of the present invention, rod 146 is an all-thread rod. In alternative embodiments, only the ends of the rod may be threaded.

Outer cover 152 includes spaced-apart first and second ends 168, 170 positioned to lie in recesses 160, 164, respectively. Outer cover 152 includes a length sufficiently large enough so that outer cover 152 abuts both of flanges 16, 18 and pipes 38, 128 of treatment cores 22, 24 and bypass core 26 are not subjected to loads imparted by flanges 16, 18. Outer cover 152 is made of a structural material of sufficient strength to endure loads imparted by flanges 16, 18. In preferred embodiments of the present invention, outer cover 152 is made of schedule 160 stainless steel pipe. A gasket 172 is positioned to lie between each end 168, 170 of outer cover 152 and flanges 16, 18, respectively.

During assembly, pipes 38 of treatment cores 22, 24 are positioned to lie in treatment core-receiving apertures 84 of flange 16 so that first end 94 of pipes 38 abut pipe-retaining lips 86 of flange 16. Similarly, during assembly, pipe 128 of bypass core 26 is positioned in bypass core-receiving aperture 138 of flange 16 so that first end 132 of pipe 128 abuts pipe-retaining lip 142 of flange 16. Later, when flange 18 is positioned to receive pipes 38, 128 and rods 146, second ends 96, 134 of pipes 38, 128, respectively, do not contact pipe-retaining lips 86, 142, respectively, of flange 18 because outer cover 152 includes a length to prevent pipes 38, 128 from being compressed by flanges 16, 18. Only outer covers 152 are compressed by flanges 16, 18. The gaskets 172 positioned between cover 152 and flanges 16, 18 are flexible enough to prevent cover 152 from being compressed by flanges 16, 18.

In alternative embodiments of the present invention, the treatment unit may be used with other fluids, gasses, or substances other than water. For example, passing gasoline through the treatment unit 10 causes the gasoline to combust cleaner and more efficient.

The treatment unit 10 permits multiple treatment cores 22, 24 to be positioned close together without producing an interference to the desired resonant frequency created by magnets 42 and rod assembly 40. If like poles 76, 78 of the ring magnets 42 and collector plates 44 are aligned for all neighboring treatment cores 22, 24, the magnets 42 can be brought as close together as needed to the point of touching without causing interference in the frequency or "magnetically induced resonance." Because the poles 76, 78 that are almost touching are like poles 76, 78, the closer the magnets 42 and the collector plates 44 of the neighboring treatment cores 22, 24 are to one another, the stronger the frequency.

The use of a bypass core 26 positioned in parallel with the treatment cores 22, 24 permits a selected percentage of untreated water to pass through the treatment unit 10. All of the bypass and treatment cores 22, 24, 26 are sealed directly into flanges 16, 18 for easy installation into an existing piping system.

Although this invention has been described in detail with reference to certain embodiments, variations and modifications exist within the scope and spirit of the invention as described and as defined in the following claims.

What is claimed is:

1. A liquid treatment unit having a longitudinal axis, the liquid treatment unit comprising
   a first pipe coupler,
   a second pipe coupler spaced apart from the first pipe coupler along the longitudinal axis,
   a first treatment core extending between the first and second pipe couplers, the first treatment core including a pipe having an outer surface and an inner surface that defines an interior region through which liquid is permitted to flow, a rod extending through the interior region of the pipe, and a plurality of magnets coupled to the pipe, the magnets including spaced-apart north and south poles, the magnets and the rod cooperate to create magnetic lines of flux flowing through the interior region of the pipe, and
   a second treatment core extending between the first and second pipe couplers, the second treatment core including a pipe having an outer surface and an inner surface that defines an interior region through which liquid is permitted to flow, a rod extending through the interior region of the pipe, and a plurality of magnets coupled to the pipe, the magnets including spaced-apart north and south poles, the magnets and the rod cooperate to create magnetic lines of flux flowing through the interior region of the pipe, the magnets of the first and second treatment cores being positioned to align the north poles of the first treatment core magnets with the north poles of the second treatment core magnets along the longitudinal axis and align the south poles of the first treatment core magnets with the south poles of the second treatment core magnets along the longitudinal axis.

2. The liquid treatment unit of claim 1, further comprising a bypass core extending between the first and second pipe couplers, the bypass core not including magnets.

3. The liquid treatment unit of claim 2, wherein the bypass core is sealed to the first and second pipe couplers.

4. The liquid treatment unit of claim 2, wherein the bypass core includes a pipe having an interior region through which liquid is permitted to flow and first and second seals, the first seal being positioned between the bypass core pipe and the first pipe coupler, and the second seal being positioned between the bypass core pipe and the second pipe coupler.

5. The liquid treatment unit of claim 4, wherein each of the first and second pipe couplers includes an aperture configured to receive the bypass core pipe, each of the apertures includes a seal-receiving groove, the first seal is positioned to lie in the seal-receiving groove in the first pipe coupler, and the second seal is positioned to lie in the seal-receiving groove in the second pipe coupler.

6. The liquid treatment unit of claim 1, wherein each of the first and second treatment units include a spring positioned between one of the first and second pipe couplers and the plurality of magnets to maintain the alignment of the magnets regardless of the orientation of the liquid treatment unit.

7. The liquid treatment unit of claim 6, wherein each of the first and second treatment cores includes a retaining ring positioned around the outer surface of the treatment core pipe and between the spring and one of the first and second pipe couplers, the spring biases the magnets away from the retaining ring.

8. The liquid treatment unit of claim 6, wherein each of the first and second treatment units further includes non-magnetic spacers positioned between each of the magnets, the spring being configured to eliminate gaps between the magnets and spacers to maintain alignment of the magnets of the first and second treatment cores.

9. The liquid treatment unit of claim 1, wherein each of the first and second pipe couplers includes first and second apertures configured to receive the first and second treatments cores, each of the apertures being defined by a pipe-engaging lip that has a first surface that abuts the pipe of the first and second treatment cores.

10. The liquid treatment unit of claim 9, wherein the pipe-engaging lip includes a second surface, the liquid treatment unit further comprises an alignment plate that is coupled to the rod of the first treatment unit, and the alignment plate abuts the second surface of the pipe-engaging lip.

11. The liquid treatment unit of claim 1, wherein the magnets are ring magnets positioned around the outer surface of the pipes of the first and second treatment cores.

12. The liquid treatment unit of claim 11, wherein the ring magnets of the first and second treatment cores are aligned along the longitudinal axis in side-by-side relation.

13. The liquid treatment unit of claim 1, wherein the first and second treatment cores are sealed to the first and second pipe couplers.

14. The liquid treatment unit of claim 13, wherein each of the first and second treatment cores further includes first and second seals, each of the first seals are positioned between a treatment core pipe and the first pipe coupler, and each of the second seals being positioned between a treatment core pipe and the second pipe coupler.

15. The liquid treatment unit of claim 14, wherein each of the first and second pipe couplers includes an aperture configured to receive the treatment core pipe, each of the apertures includes a seal-receiving groove, the first seal is positioned to lie in the seal-receiving groove in the first pipe coupler, and the second seal is positioned to lie in the seal-receiving groove in the second pipe coupler.

16. The liquid treatment unit of claim 1, wherein each of the first and second treatment cores further includes spacers positioned between the magnets, the spacers being sized to align the magnets of the first treatment core with the magnets of the second treatment core along the longitudinal axis.

17. The liquid treatment unit of claim 1, wherein each of the first and second treatment cores includes collector plates abutting the north and south poles of the magnets.

18. The liquid treatment unit of claim 17, wherein each of the treatment cores further includes spacers positioned between the collector plates, the spacers being sized to align the collector plates of the first treatment core with the collector plates of the second treatment core.

19. The liquid treatment unit of claim 1, wherein the rod is made of material which attracts magnetic lines of flux.

20. The liquid treatment unit of claim 19, wherein the rod is made of a soft iron material.

21. The liquid treatment unit of claim 19, further comprising a hollow tube and first and second inserts, the rod is positioned in the hollow tube, and the first and second inserts trap the rod within the hollow tube.

22. The liquid treatment unit of claim 21, wherein the hollow tube and first and second inserts are made of a corrosion resistant material.

23. The liquid treatment unit of claim 21, wherein the hollow tube and first and second inserts are made of stainless steel.

24. A liquid treatment unit comprising first and second pipes, first and second rods, the first rod extending through the first pipe, and the second rod extending through the second pipe, and a plurality of magnets coupled to the first and second pipes, each of the plurality of magnets having a north pole and a south pole, the plurality of magnets and the first and second rods cooperating to create magnetic lines of flux through which liquid flows, the magnets being coupled to the first and second pipes so that the north and south poles of the magnets are aligned.

25. A liquid treatment unit comprising first and second pipe couplers, first and second pipes through which liquid flows, the first and second pipes extending between the first and second pipe couplers, a first rod extending through the first pipe, a plurality of magnets coupled to the first pipe, the plurality of magnets and the first rod cooperating to create magnetic lines of flux through which liquid flows, and first, second, third, and fourth seals, the first seal being positioned between the first pipe coupler and the first pipe, the second seal being positioned between the first pipe coupler and the second pipe, the third seal being positioned between the second pipe coupler and the first pipe, and the fourth seal being positioned between the second pipe coupler and the second pipe to seal the first and second pipes to the first and second pipe couplers.

26. A method for treating a liquid, the method comprising the steps of providing first and second pipes, a plurality of magnets coupled to the first and second pipes, and first and second rods, the first rod extending through the first pipe, the second rod extending through the second pipe, the magnets including north and south poles, and the magnets being coupled to the first and second pipes so that the north poles of the magnets coupled to the first pipe are aligned with the north poles of the magnets coupled to the second pipe and the south poles of the magnets coupled to the first pipe are aligned with the south poles of the magnets coupled to the second pipe, the magnets and rods extending through the first and second pipes cooperating to create magnetic lines of flux in the first and second pipes, and passing liquid through the magnetic lines of flux in the first and second pipes to treat the liquid.

27. The method of claim 26, further comprising the step of providing first and second pipe couplers adapted to couple the first and second pipes to a piping system, the first and second pipes being sealed to the first and second pipe couplers.

28. The method of claim 27, further comprising the steps of providing a third pipe that is sealed to the first and second pipe couplers and passing liquid through the third pipe.

* * * * *